US009533592B2

(12) United States Patent
Kamikihara et al.

(10) Patent No.: US 9,533,592 B2
(45) Date of Patent: Jan. 3, 2017

(54) VEHICLE

(71) Applicant: TOYOTA JIDOSHA KABUSHIKI KAISHA, Toyota-shi, Aichi-ken (JP)

(72) Inventors: Daisuke Kamikihara, Toyota (JP); Hiroaki Yuasa, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 242 days.

(21) Appl. No.: 14/462,100

(22) Filed: Aug. 18, 2014

(65) Prior Publication Data

US 2015/0069964 A1 Mar. 12, 2015

(30) Foreign Application Priority Data

Sep. 11, 2013 (JP) .................................. 2013-188446

(51) Int. Cl.
*H02J 7/00* (2006.01)
*B60L 11/18* (2006.01)
(Continued)

(52) U.S. Cl.
CPC ................ *B60L 11/182* (2013.01); *B60K 1/04* (2013.01); *B60L 1/003* (2013.01); *B60L 1/02* (2013.01); *B60L 3/0007* (2013.01); *B60L 3/0046* (2013.01); *B60L 11/005* (2013.01); *B60L 11/14* (2013.01); *B60L 11/1824* (2013.01); *B60L 11/1846* (2013.01); *B60L 11/1874* (2013.01); *B60L 11/1877* (2013.01); *B60L 11/1879* (2013.01); *B60K 2001/0416* (2013.01); *B60L 2210/10* (2013.01); *B60L 2210/30* (2013.01); *B60L 2210/40* (2013.01); *B60L 2230/10* (2013.01); *B60L 2240/36* (2013.01);
(Continued)

(58) Field of Classification Search
CPC ....................................................... H02J 7/025
USPC ......................................................... 320/108
See application file for complete search history.

(56) References Cited

U.S. PATENT DOCUMENTS 5,654,621 A * 8/1997 Seelig ................... B60L 11/182
320/108
7,741,734 B2 6/2010 Joannopoulos et al.
(Continued)

FOREIGN PATENT DOCUMENTS

EP 2814047 A1 12/2014
JP 2011-049230 A 3/2011
(Continued)

*Primary Examiner* — Suresh Memula
(74) *Attorney, Agent, or Firm* — Oliff PLC

(57) ABSTRACT

An electrically powered vehicle is provided with a vehicle body having a bottom surface, a battery disposed inside the vehicle body, a power receiving device configured to receive electrical power in a non-contact manner from a power transmission coil of a power transmission device disposed outside the vehicle body when facing the power transmission coil, and an electrical apparatus electrically connected to the power receiving device and the battery for supplying power received from the power receiving device to the battery. The power receiving device includes a power receiving coil disposed on the bottom surface of the vehicle body, and a capacitor disposed inside the vehicle body and electrically connected to the power receiving coil and the electrical apparatus. Thereby, the impact of heat on the capacitor included in the power receiving device can be suppressed.

6 Claims, 8 Drawing Sheets

(51) Int. Cl.
　　*B60K 1/04*　　(2006.01)
　　*B60L 1/00*　　(2006.01)
　　*B60L 1/02*　　(2006.01)
　　*B60L 3/00*　　(2006.01)
　　*B60L 11/00*　　(2006.01)
　　*B60L 11/14*　　(2006.01)

(52) U.S. Cl.
　　CPC ... *B60L 2240/525* (2013.01); *B60L 2240/527* (2013.01); *B60L 2240/529* (2013.01); *B60L 2240/547* (2013.01); *B60L 2240/549* (2013.01); *B60L 2250/12* (2013.01); *B60L 2250/16* (2013.01); *B60L 2250/26* (2013.01); *Y02T 10/70* (2013.01); *Y02T 10/7005* (2013.01); *Y02T 10/705* (2013.01); *Y02T 10/7022* (2013.01); *Y02T 10/7077* (2013.01); *Y02T 10/7088* (2013.01); *Y02T 10/7216* (2013.01); *Y02T 10/7241* (2013.01); *Y02T 90/121* (2013.01); *Y02T 90/122* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01)

(56) References Cited

U.S. PATENT DOCUMENTS

| | | |
|---|---|---|
| 2007/0222542 A1 | 9/2007 | Joannopoulos et al. |
| 2008/0278264 A1 | 11/2008 | Karalis et al. |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2011/0109262 A1* | 5/2011 | Iizuka .................. B60L 11/182 320/108 |
| 2012/0043931 A1* | 2/2012 | Terao ..................... H02J 7/025 320/108 |
| 2012/0161530 A1* | 6/2012 | Urano .................... H02J 7/025 307/104 |
| 2013/0037365 A1* | 2/2013 | Ichikawa ............... B60L 11/123 191/10 |
| 2013/0127409 A1 | 5/2013 | Ichikawa |
| 2013/0193749 A1* | 8/2013 | Nakamura ................ B60L 3/00 307/9.1 |
| 2013/0293192 A1* | 11/2013 | Abe ...................... B60L 11/123 320/108 |
| 2014/0015455 A1 | 1/2014 | Yonehana |
| 2014/0084697 A1 | 3/2014 | Yasuda et al. |
| 2014/0132210 A1* | 5/2014 | Partovi .................. H02J 5/005 320/108 |
| 2014/0191586 A1* | 7/2014 | Ichikawa ................ H01F 38/14 307/104 |
| 2014/0305722 A1* | 10/2014 | Ichikawa ............... B60L 11/182 180/65.31 |
| 2014/0320078 A1* | 10/2014 | Nakamura ............... B60L 11/14 320/108 |
| 2015/0091511 A1* | 4/2015 | Ichikawa ................ H02J 5/005 320/108 |
| 2015/0180285 A1* | 6/2015 | Yamakawa ........... B60L 11/182 307/104 |

FOREIGN PATENT DOCUMENTS

| | | |
|---|---|---|
| JP | 2011-244532 A | 12/2011 |
| JP | A-2011-250593 | 12/2011 |
| JP | A-2012-222956 | 11/2012 |
| JP | 2013-123371 A | 6/2013 |
| JP | A-2013-110822 | 6/2013 |
| JP | A-2013-126327 | 6/2013 |
| JP | A-2013-146148 | 7/2013 |
| JP | A-2013-146154 | 7/2013 |
| JP | A-2013-154815 | 8/2013 |
| WO | WO 2007/008646 A2 | 1/2007 |
| WO | WO 2008/118178 A1 | 10/2008 |
| WO | 2012/099170 A1 | 7/2012 |
| WO | 2012/132582 A1 | 10/2012 |
| WO | 2013/076804 A1 | 5/2013 |
| WO | WO 2013/108108 A2 | 7/2013 |
| WO | 2013/118745 A1 | 8/2013 |

* cited by examiner

VEHICLE

This nonprovisional application is based on Japanese Patent Application No. 2013-188446 filed on Sep. 11, 2013 with the Japan Patent Office, the entire contents of which are hereby incorporated by reference.

BACKGROUND OF THE INVENTION

Field of the Invention

The present invention relates to a vehicle, and more particularly relates to a vehicle including a power receiving device configured to receive electrical power in a non-contact manner from a power transmission device.

Description of the Background Art

As disclosed in Japanese Patent Laying-Open No. 2011-250593, Japanese. Patent Laying-Open No. 2013-154815, Japanese Patent Laying-Open No. 2013-146154, Japanese Patent Laying-Open No. 2013-146148, Japanese Patent Laying-Open No. 2013-110822 and Japanese Patent Laying-Open No. 2013-126327, in recent years, developments have been progressed on a vehicle including a power receiving device configured to receive electrical power in a non-contact manner from a power transmission device disposed on the ground. The power receiving device disclosed in Japanese Patent Laying-Open No. 2011-250593 is disposed on a bottom surface of the vehicle. The power receiving device includes a case, a coil and a capacitor. The coil and the capacitor are electrically connected to each other and disposed inside the case.

SUMMARY OF THE INVENTION

Since an exhaust pipe, a catalyst and the like are disposed on the bottom surface of the vehicle, the power receiving device disposed on the bottom surface of the vehicle is susceptible to heat originated from these devices and/or from the ground. The capacitance of the capacitor is dependent on temperature. The resonance frequency of an electrical circuit composed of the capacitor and the coil will fluctuate in response to the temperature variation of the capacitor. In the case where the capacitor included in the power receiving device is affected by heat, it is concerned that the resonance frequency mismatching will occur, which deteriorates the power transfer efficiency.

An objective of the present invention is to provide a vehicle having a configuration capable of suppressing thermal effect on a capacitor included in a power receiving device.

The vehicle includes a vehicle body having a bottom surface, a battery disposed inside the vehicle body, a power receiving device configured to receive electrical power in a non-contact manner from a power transmission coil of a power transmission device disposed outside the vehicle body when facing the power transmission coil, and an electrical apparatus electrically connected to the power receiving device and the battery for supplying power received from the power receiving device to the battery. The power receiving device includes a power receiving coil disposed on the bottom surface of the vehicle body, and a capacitor disposed inside the vehicle body and electrically connected to the power receiving coil and the electrical apparatus. According to this configuration, since the capacitor is disposed inside the vehicle, it can be suppressed that the heat originated from such as a catalyst and an exhaust pipe disposed outside the vehicle is transferred to the capacitor.

Preferably, the battery is located posterior to a central position in the longitudinal direction of the vehicle body, the electrical apparatus is disposed inside the vehicle body, and the electrical apparatus and the capacitor are located at a position either higher or lower in the vertical direction than the position where the battery is disposed. According to this configuration, since the capacitor and the electrical apparatus are not linearly disposed relative to the battery in the longitudinal direction, in case the vehicle is involved in a tail collision, it can be suppressed that the battery crushes the capacitor and the electrical apparatus.

Preferably, if in the longitudinal direction of the vehicle body, a distance between a rear end position of the vehicle body and a rear end position of the battery is denoted by L1 and a distance between the rear end position of the vehicle body and a rear end position of the capacitor is denoted by L2, then L1 and L2 satisfy the relationship of L2>L1. According to this configuration, the capacitor is located apart from the rear end of the vehicle further than the battery. During charging, the voltage applied to the capacitor is higher than the voltage applied to the battery. In case the vehicle is involved in a tail collision, since the capacitor is located apart from the rear end of the vehicle further than the battery, the impact will be firstly absorbed by the battery before reaching the capacitor, and thereby, the damage on the capacitor can be suppressed.

Preferably, the electrical apparatus includes an insulation transformer connected to the capacitor, and if in the longitudinal direction of the vehicle body, a distance between the rear end position of the vehicle body and the rear end position of the battery is denoted by L1 and a distance between the rear end position of the vehicle body and a rear end position of the electrical apparatus is denoted by L3, then L1 and L3 satisfy the relationship of L3>L1. According to this configuration, the power transmitted in a non-contact manner is converted by the insulation transformer from a high voltage to a low voltage to be supplied to devices disposed at the side of the battery. In other words, the coil at one side of the insulation transformer is applied with a voltage equivalent to that applied to the capacitor. By disposing the insulation transformer applied with a high voltage apart from the rear end of the vehicle, it is possible to alleviate the impact applied to the insulation transformer when the vehicle is involved in a tail collision. Particularly, since the battery is subjected to the impact earlier than the insulation transformer, it is possible to alleviate the impact reaching the insulation transformer.

Preferably, the capacitor and the electrical apparatus are located below the battery, and the capacitor and the electrical apparatus are located at respective positions so that the entire projection image formed by projecting the capacitor and the electrical apparatus in the vertical direction to the battery overlaps with the battery. According to this configuration, when viewed from the above of the battery, the capacitor and the electrical apparatus are hidden below the battery, it can be suppressed that a user or the like touches the capacitor and/or the electrical apparatus.

Preferably, the capacitor and the electrical apparatus are located at a position lower in the vertical direction than the position where the battery is disposed, the vehicle further includes a control device disposed inside the vehicle body and configured to be applied with a voltage lower than that applied to the electrical apparatus, and the control device is located posterior to the electrical apparatus in the longitudinal direction of the vehicle body. According to this configuration, since the electrical apparatus is located below the battery, and the control apparatus applied with a low voltage is located posterior to the electrical apparatus, it can be suppressed that a user or the like touches the electrical apparatus.

Preferably, the capacitor and the electrical apparatus are located at a position lower in the vertical direction than the position where the battery is disposed, and the capacitor is located posterior to the electrical apparatus in the longitudinal direction of the vehicle body. According to this configuration, since the electrical apparatus is located below the battery and the capacitor is located posterior to the electrical apparatus, it can be suppressed that a user or the like touches the electrical apparatus.

According to the present invention, thermal effect on a capacitor included in a power receiving device can be suppressed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
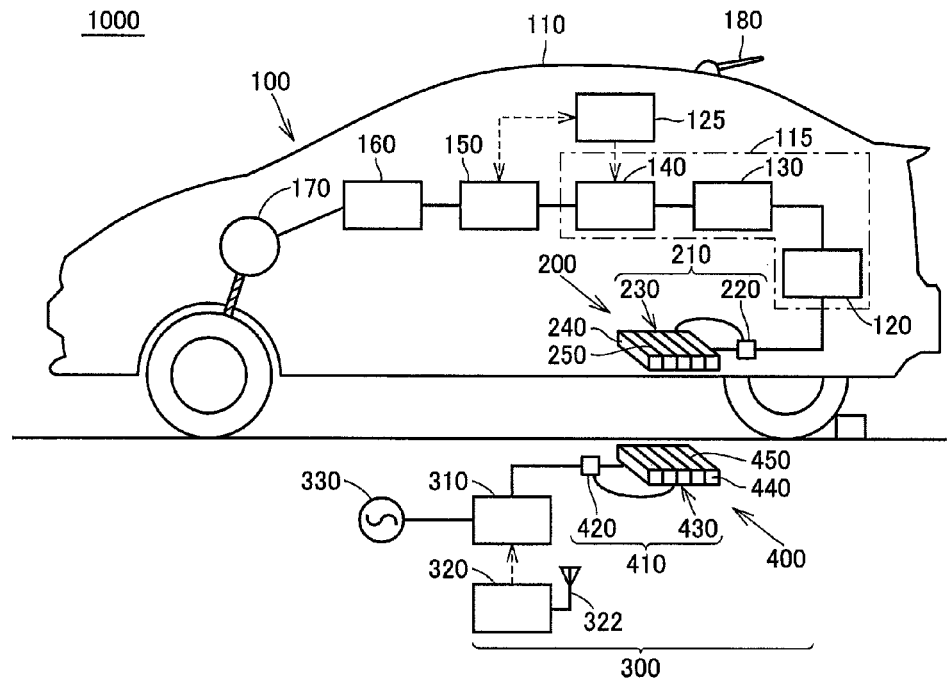
FIG. 1 is a view schematically illustrating a power transfer system according to an embodiment.

Hereinafter, embodiments according to the present invention will be described with reference to the drawings. When a reference is made to a number, an amount or the like in the description of the embodiments, the scope of the present invention is not limited to the number, the amount or the like unless otherwise specified. In the following description of embodiments and modifications, the same or equivalent component will be denoted by the same reference numerals and the description thereof may not be repeated.

Figure 2:
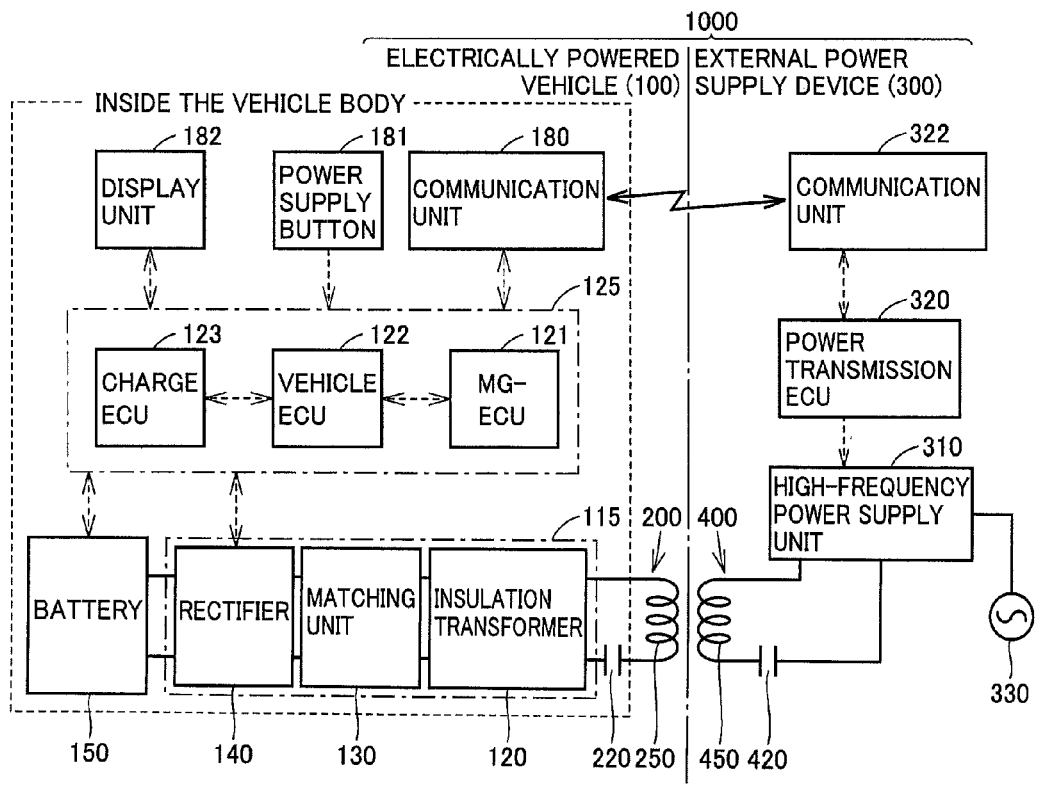
FIG. 2 is a view schematically illustrating a part of the power transfer system according to the embodiment.

A power transfer system 1000 according to an embodiment will be described with reference to FIGS. 1 and 2. FIG. 1 is a view schematically illustrating an overall configuration of power transfer system 1000, and FIG. 2 is a view schematically illustrating a part of power transfer system 1000 in detail. Power transfer system 1000 includes an external power supply device 300 and an electrically powered vehicle (vehicle) 100. In the following, the overall configuration of electrically powered vehicle 100 and external power supply device 300 will be explained alternately.

Electrically Powered Vehicle 100

Referring mainly to FIG. 1, electrically powered vehicle 100 includes a vehicle body 110 and a power receiving device 200. Power receiving device 200 includes a power receiving coil (secondary coil) 250. Meanwhile, external power supply device 300 includes a power transmission device 400, and power transmission device 400 includes a power transmission coil (primary coil) 450. As to be described later in detail, power receiving device 200 is configured to receive electrical power in a non-contact manner from power transmission device 400 when power receiving coil 250 of power receiving device 200 faces power transmission coil 450 of power transmission device 400.

Vehicle body 110 is provided with an electrical apparatus 115, a control device 125, a battery 150, a power control unit 160, a motor unit 170, a communication unit 180 and the like. Electrical apparatus 115 is electrically connected to power receiving device 200 and battery 150, and is provided with an insulation transformer 120, a matching device 130 and a rectifier 140. Control device 125 (see FIG. 2) is provided with an MG-ECU 121 (MG: Motor-Generator), a vehicle ECU 122, a charge ECU 123 and the like.

Figure 3:
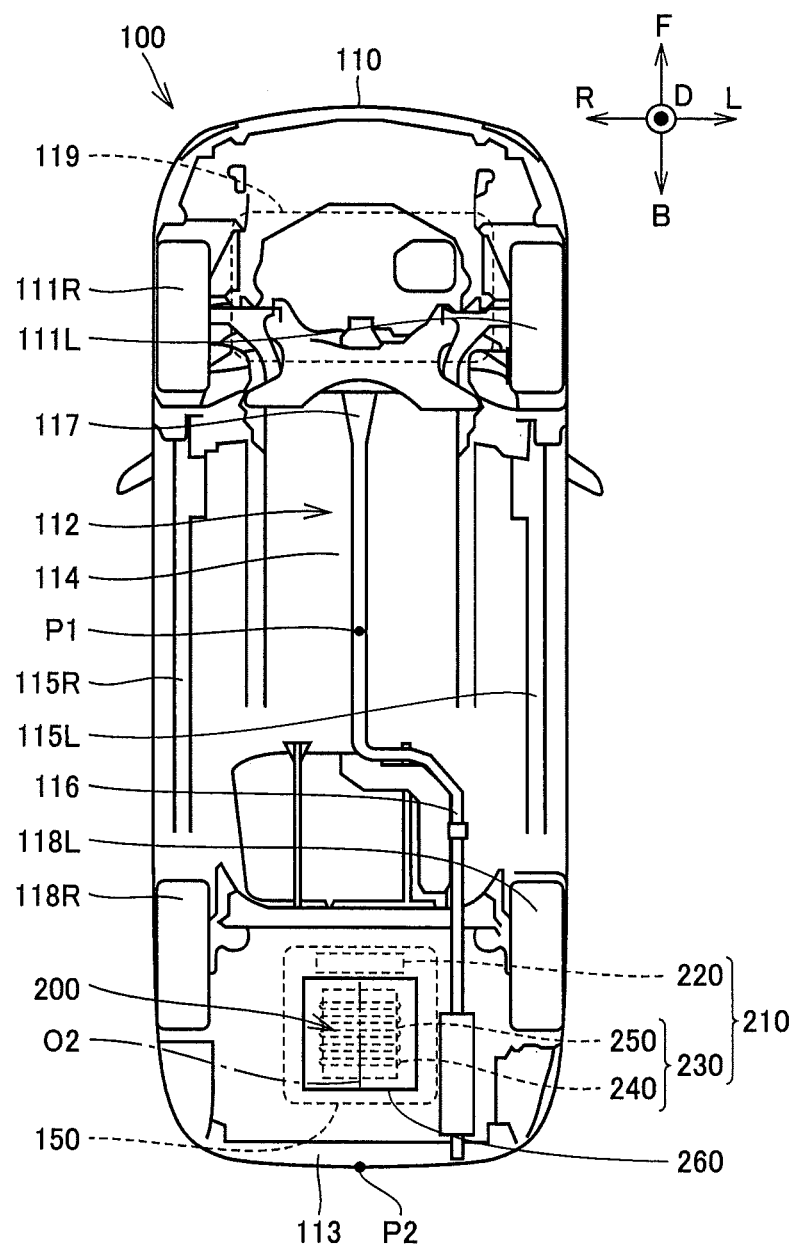
FIG. 3 is a bottom view schematically illustrating an electrically powered vehicle according to the embodiment.

Power receiving device 200 is provided with a power receiving unit 210 and a housing 260 (see FIG. 3). Power receiving unit 210 includes a solenoid coil unit 230 and a capacitor 220 connected to coil unit 230. Coil unit 230 is composed of a ferrite core 240, a resin stationary member (not shown) configured to sandwich core 240 and thereby stabilize the same, and a power receiving coil 250. As to be described later in detail, coil unit 230 is disposed inside housing 260, capacitor 220 is disposed inside vehicle body 110.

Power receiving coil 250 is wound around the outer peripheral surface of the stationary member, and is configured to surround a coil center axis O2 (see FIG. 3). Coil center axis O2 extends in a direction parallel to the longitudinal direction of vehicle body 110. Power receiving coil 250 is configured to have a stray capacitance, and is connected to insulation transformer 120 through the intermediary of capacitor 220. The inductance of power receiving coil 250, the stray capacitance of power receiving coil 250, and the capacitance of capacitor 220 constitute an electrical circuit. Although capacitor 220 and power receiving coil 250 are connected in series in FIG. 2, they may be connected in parallel. The distance between power receiving coil 250 and power transmission coil 450 of power transmission device 400 and/or the number of turns of power receiving coil 250 may be set appropriately so as to make greater a Q value indicating the resonance strength between power transmission coil 450 and power receiving coil 250 (Q≥100, for example), a coupling coefficient κ indicating the degree of coupling therebetween and the like.

Insulation transformer 120 is connected to matching unit 130. Insulation transformer 120 converts a high-frequency AC power received from power receiving coil 250 to a predetermined level of voltage. Specifically, insulating transformer 120 lowers the level of a voltage received from power receiving coil 250 and capacitor 220, and outputs it to matching unit 130 disposed closer to the battery than to insulation transformer 120. Matching unit 130 matches the impedance of power transmission device 400 with the impedance of electrically powered vehicle 100.

Rectifier 140 converts a high-frequency AC current received from matching unit 130 to a DC current and supplies it to battery 150. A DC/DC converter or the like can be disposed between rectifier 140 and battery 150. In the present embodiment, insulation transformer 120, matching unit 130 and rectifier 140 function as electrical apparatus 115 supplying electrical power received from power receiving device 200 to battery 150. In the case where the DC/DC converter is provided, the converter is also included in the electrical apparatus. Electrical apparatus 115 may be constituted by a part of the devices mentioned above, or may be provided with a device other than these devices.

Power control unit 160 is connected to battery 150. Motor unit 170 is connected to power control unit 160. Power control unit 160 includes a converter (not shown) connected to battery 150, and an inverter (not shown) connected to the converter. The converter adjusts (boosts) the DC current supplied from battery 150 and outputs it to the inverter. The inverter converts the DC current supplied from the converter to an AC current and supplies it to motor unit 170.

Motor unit 170 includes a motor generator which functions as a generator, and a motor generator which functions as a motor. Motor unit 170 may be, for example, a three-phase AC motor. Motor unit 170 is driven by the AC current supplied from the inverter of power control unit 160.

Control device 125 controls the operation of each device disposed inside vehicle body 110. For example, when the operation mode of the vehicle is set to a running mode, vehicle ECU 122 issues an instruction to MG-ECU 121, instructing it to make power control unit 160 execute a running control. MG-ECU 121 issues a control instruction to power control unit 160 in accordance with the operational status of a brake pedal and an accelerator pedal and/or the running conditions of the vehicle.

If vehicle ECU 122 detects that a power supply button 181 is set to the on state while vehicle body 110 is not running, the operation mode of the vehicle is switched to a charging mode. Vehicle ECU 122 issues an instruction to charge ECU 123, instructing it to make an external power supply device 300 execute a charging control on battery 150. Upon receiving a charging-initiation instruction from vehicle ECU 122, charge ECU 123 instructs external power supply device 300 to execute the charging control on battery 150, and meanwhile issues to communication unit 180 an instruction denoting that the power is being supplied to electrically powered vehicle 100 from external power supply device 300.

External Power Supply Device 300

External power supply device 300 includes power transmission device 400, a high-frequency power supply unit 310, a power transmission ECU 320, and a communication unit 322. High-frequency power supply unit 310 is connected to an AC power source 330. AC power source 330 is a commercial power source or an independent power supply source. Power transmission device 400 is disposed for example in a parking space, and is connected to high-frequency power supply unit 310. Power transmission ECU 320 controls the operation of high-frequency power supply unit 310 and the like.

Communication unit 322 is a communication interface for performing wireless communication between external power supply device 300 and electrically powered vehicle 100. Communication unit 322 is configured to receive battery information, a power transmission initiation signal and a power transmission termination signal or the like transmitted from communication unit 180 of electrically powered vehicle 100, and send those information and signals to power transmission ECU 320.

Power transmission device 400 includes a power transmission unit 410 and a housing (not shown) for accommodating transmission unit 410. Power transmission unit 410 includes a solenoid coil unit 430, and a capacitor 420 connected to coil unit 430. Coil unit 430 is composed of a ferrite core 440, a resin stationary member (not shown) configured to stabilize core 440, and a power transmission coil 450.

Power transmission coil 450 is configured to have a stray capacitance, and is connected to high-frequency power supply unit 310 through the intermediary of capacitor 420. The inductance of power transmission coil 450, the stray capacitance of power transmission coil 450 and the capacitance of capacitor 420 constitute an electrical circuit. Although capacitor 420 and power transmission coil 450 are connected in series in FIG. 2, they may be connected in parallel.

Power transmission ECU 320 controls each device in external power supply device 300. High-frequency power supply unit 310 converts the power received from AC power source 330 to high-frequency electric power, and supplies the converted high-frequency electric power to power transmission coil 450. Power transmission coil 450 transmits the power in a non-contact manner to power receiving coil 250 of power receiving unit 210 through electromagnetic induction.

Detailed Structure of Electrically Powered Vehicle 100

Figure 4:
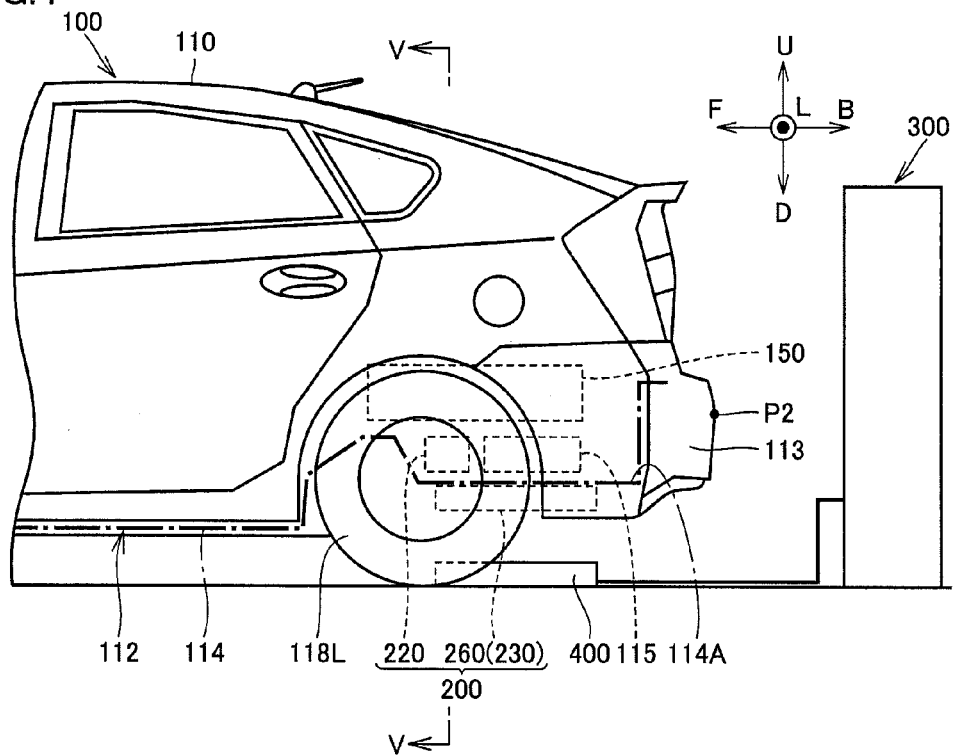
FIG. 4 is a lateral view schematically illustrating the electrically powered vehicle according to the embodiment.
Figure 5:
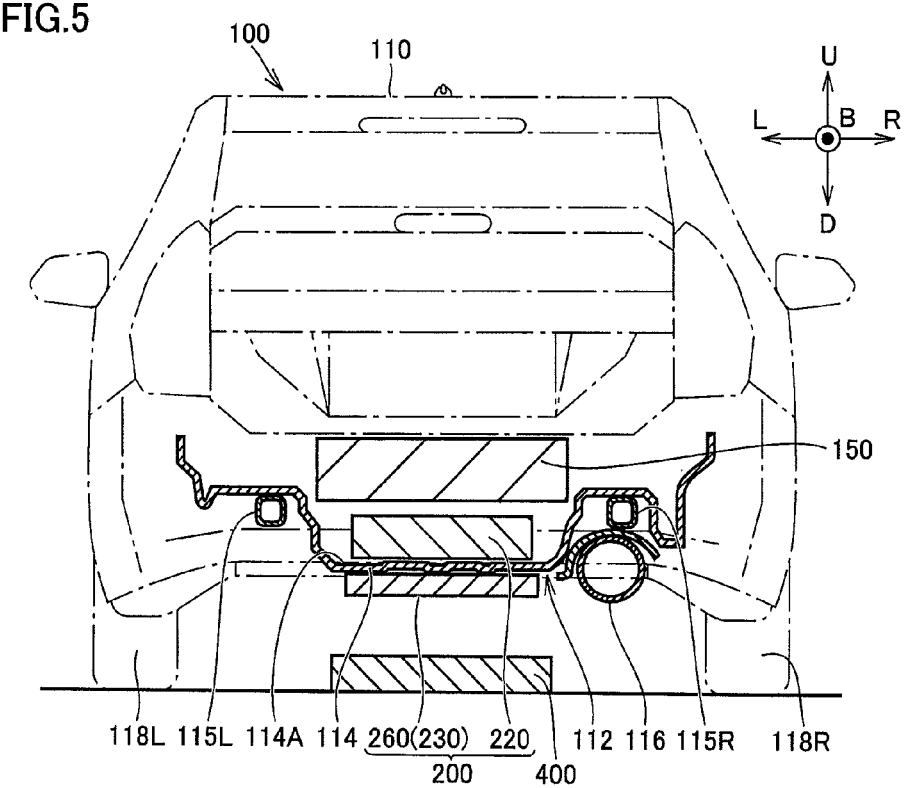
FIG. 5 is a sectional view taken along an arrow line V-V in FIG. 4.

FIG. 3 and FIG. 4 are a bottom view and a lateral view, respectively, illustrating electrically powered vehicle 100, and FIG. 5 is a sectional view taken along the arrow line V-V in FIG. 4. In FIGS. 3 to 5, the vertically upward direction is denoted by letter "U", the vertically downward direction is denoted by letter "D", the leftward direction of the vehicle is denoted by letter "L,", the rightward direction of the vehicle is denoted by letter "R", the forward direction of the vehicle is denoted by letter "F", and the backward direction of the vehicle is denoted by letter "B". The same applies to FIGS. 6 to 14 which will be described later.

With reference to FIGS. 3 to 5, vehicle body 110 of electrically powered vehicle 100 has a bottom surface 112. In a state where wheels 111R, 111L, 118R and 118L (see FIG. 3) are contacting the ground, when viewed from vertically downward direction D at a position distant from the ground, bottom surface 112 is a visible area of vehicle body 110. Bottom surface 112 has a center position P1 (see FIG. 3). Center position P1 is located at the center of bottom surface 112 in both the longitudinal direction (forward direction F and backward direction B) and the width direction (leftward direction L and rightward direction R) of vehicle body 110.

On bottom surface 112, a floor panel 114 (see FIGS. 3 to 5), side members 115R and 115L (see FIGS. 3 to 5), an exhaust pipe 116 (see FIGS. 3 to 5), a cross member (not shown) and the like are provided. Floor panel 114 is a member having a plate shape and configured to partition the inside of vehicle body 110 and the outside of vehicle body 110. Side members 115R and 115L and cross member are disposed on the lower surface of floor panel 114.

The rear end of vehicle body 110 is provided with a rear bumper 113. Rear bumper 113 includes a rear end position P2. Rear end position P2 is a portion located in the rearmost of vehicle body 110 in the longitudinal direction of vehicle body 110.

An engine 119 (see FIG. 3) is installed inside vehicle body 110 together with battery 150. Engine 119 is disposed at the front side (the side to forward direction F of the vehicle) anterior to center position P1 in the longitudinal direction. Exhaust pipe 116 is connected to engine 119 through the intermediary of a catalyst 117 (see FIG. 3). On the other hand, battery 150 is disposed at the rear side (the side to backward direction B of the vehicle) posterior to center position P1 in the longitudinal direction. Battery 150 may be disposed at the front side (the side to forward direction F of the vehicle) anterior to center position P1 in the longitudinal direction.

With reference to FIGS. 4 and 5, as described above, power receiving device 200 includes capacitor 220, coil unit 230 and housing 260. Housing 260 is secured on bottom surface 112 and located outside vehicle body 110. As a way of securing housing 260 on bottom surface 112, housing 260 may be secured directly on floor panel 114 or may be suspended from side members 115R and 115L or the cross member.

Coil unit 230 (specifically, core 240 and power receiving coil 250) is disposed inside housing 260. When saying that power receiving coil 250 is disposed on bottom surface 112 of vehicle body 110, it means that power receiving coil 250 is disposed inside housing 260 provided on bottom surface 112.

On the one hand, capacitor 220 is located outside housing 260, and is disposed inside vehicle body 110. When saying that capacitor 220 is disposed inside vehicle body 110, it means that capacitor 220 is located at least at a position higher than floor panel 114 in vertically upward direction U and located inner to any member constituting vehicle body 110. Capacitor 220 provided inside vehicle body 110 is electrically connected to power receiving coil 250 and electrical apparatus 115 through a wiring member (not shown). Capacitor 220 and coil unit 230 function (see FIGS. 1 and 2) as power receiving unit 210 (see FIG. 3).

In addition to capacitor 220, battery 150 and electrical apparatus 115 (i.e., insulating transformer 120 and the like illustrated in FIGS. 1 and 2) are also provided inside vehicle body 110. Similar to the case of capacitor 220, when saying that battery 150 and electrical apparatus 115 are provided inside vehicle body 110, it means that battery 150 and electrical apparatus 115 are disposed at a position in vertically upward direction U higher than at least floor panel 114 and located inner to any member constituting vehicle body 110.

Floor panel 114 is provided with an accommodation recess 114A. Accommodation recess 114A is disposed posterior to center position P1 (see FIG. 3) in the longitudinal direction (at the side of backward direction B of the vehicle). Capacitor 220 and electrical apparatus 115 are located above accommodation recess 114A in vertically upward direction U. Electrical apparatus 115 and capacitors 220 are located at a position lower in the vertical direction (lower side in the vertical direction) than the position where battery 150 is provided.

Capacitor 220 and electrical apparatus 115 (including insulation transformer 120, matching unit 130 and rectifier 140) are disposed inside a housing (not shown) as a charging unit. Inside the housing, a cooling unit such as a fan for cooling the capacitor and the like may be provided. In addition, a floor board is provided on the upper surface of battery 150, and a luggage compartment is provided upper the floor board. A rear seat may be provided above battery 150 in vertically upward direction U, for example.

When saying that electrical apparatus 115 is located at a position lower in vertically downward direction D (lower side in the vertical direction) than the position where battery 150 is provided, it means that the uppermost portion of members constituting electrical apparatus 115 is located at a position lower in the vertical direction than the lowest portion of members constituting battery 150.

Similarly, when saying that capacitor 220 is disposed at a position lower in vertically downward direction D (lower side in the vertical direction) than the position where battery 150 is provided, it means that the uppermost portion of members constituting capacitor 220 is located at a position lower in the vertical direction than the lowest portion of members constituting battery 150.

Figure 6:
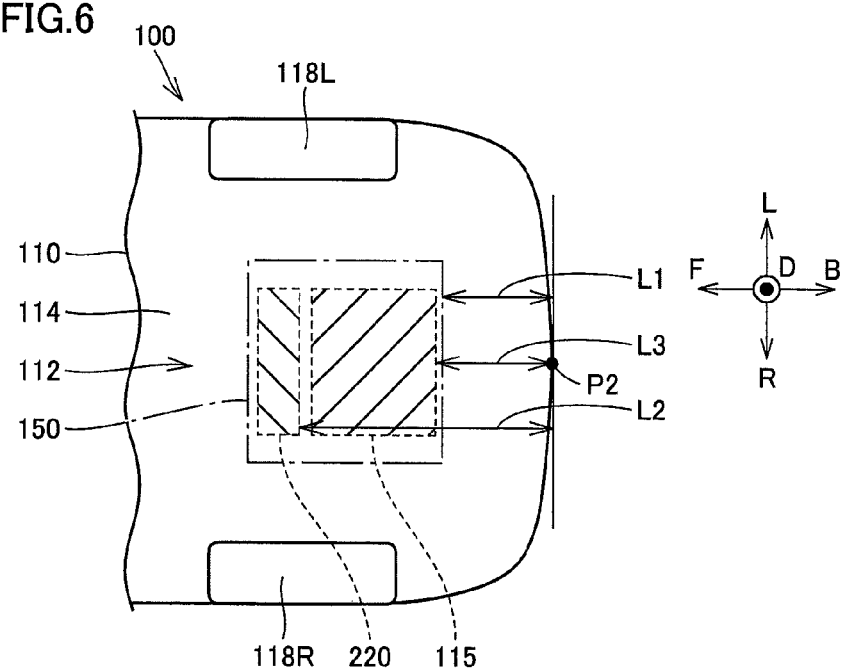
FIG. 6 is a bottom view schematically illustrating a part of the electrically powered vehicle according to the embodiment.

FIG. 6 is a bottom view schematically illustrating vehicle body 110. In the longitudinal direction of vehicle body 110, if a distance between rear end position P2 of vehicle body 110 and the rear end position of battery 150 is denoted by L1 and a distance between rear end position P2 of vehicle body 110 and the rear end position of capacitor 220 is denoted by L2, then L1 and L2 in electrically powered vehicle 100 satisfy the relationship of L2>L1.

Further, in the longitudinal direction of vehicle body 110, if a distance between rear end position P2 of vehicle body 110 and the rear end position of battery 150 is denoted by L1 and a distance between rear end position P2 of vehicle body 110 and the rear end position of electrical apparatus 115 is denoted by L3, then L1 and L3 in electrically powered vehicle 100 satisfy the relationship of L3>L1.

In vehicle body 110 according to the present embodiment, L1, L2 and L3 satisfy the relationship of L2>L3>L1, and thereby, capacitor 220 is located anterior to electrical apparatus 115 in the longitudinal direction of vehicle body 110. Capacitor 220 and electrical apparatus 115 are located at respective positions so that the entire projection image formed by projecting capacitor 220 and electrical apparatus 115 in the vertical direction to battery 115 overlaps with battery 150.

Functions and Effects

After the positioning is performed between power receiving unit 210 (see FIGS. 1 and 2) and power transmission unit 410 (see FIGS. 1 and 2), the power transfer is performed between power receiving unit 210 and power transmission unit 410. In the present embodiment, capacitor 220 is provided inside vehicle body 110. As compared with the case where the capacitor is disposed on the bottom surface of the vehicle body, capacitor 220 according to the present embodiment is less susceptible to the heat from heat radiating members such as exhaust pipe 116 provided on bottom surface 112 of vehicle body 110 and/or heat from the ground. Thus, the thermal effect on capacitor 220 disposed in power receiving device 200 can be suppressed.

Accordingly, the resonance frequency of the electrical circuit composed of capacitor 220 and power receiving coil 250 may fluctuate smaller, and thereby, it can be effectively suppressed the shift in the resonance frequency deteriorates the power transfer efficiency. Since capacitor 220 is disposed inside vehicle body 110, it will not be affected by dusts or the like present outside vehicle body 110. Since capacitor 220 is provided outside housing 260, it is possible to make housing 260 compact in size.

As described above, electrical apparatus 115 and capacitor 220 are disposed at a position lower in vertically downward direction D (lower side in the vertical direction) than the position where battery 150 is provided. The position of battery 150 and the position of electrical apparatus 115 and capacitor 220 are offset in the vertical direction. Even though electrically powered vehicle 100 is subjected to an impact from the rear side, it is substantially impossible that battery 150 will come into contact with electrical apparatus 115 and capacitor 220. Thus, it can be suppressed that battery 150 presses electrical apparatus 115 and capacitor 220 and thereby damages the same.

As described above, since L1 and L2 in electrically powered vehicle 100 satisfy the relationship L2>L1 (see FIG. 6), battery 150 is located posterior to capacitor 220. Supposing that electrically powered vehicle 100 encounters an impact from the rear side, capacitor 220 is subjected to the impact earlier than battery 150. In general, battery 150 has an impact resistant property. Since battery 150 is designed to block the impact from reaching capacitor 220, the damage on capacitor 220 can be suppressed. In particular, during the charging, the voltage applied to the capacitor is higher than the voltage applied to the battery. As described above, by disposing the capacitor away from the rear end of the vehicle, it is possible to protect the capacitor in a tail collision.

As described above, since L1 and L3 in electrically powered vehicle 100 satisfy the relationship of L3>L1 (see FIG. 6), battery 150 is located posterior to electrical apparatus 115. Supposing that electrically powered vehicle 100 encounters an impact from the rear side, capacitor 220 is subjected to the impact earlier than electrical apparatus 115. Since battery 150 is designed to block the impact from reaching electrical apparatus 115, the damage on electrical apparatus 115 can be suppressed. In particular, during the charging, insulation transformer 120 is applied with a high voltage from capacitor 220 and power receiving coil 250, and thus by setting distance L3 longer than the distance between insulation transformer 120 and the rear end of the vehicle, it is possible to protect insulation transformer 120 in a tail collision.

As described above, capacitor 220 and electrical apparatus 115 are disposed at a position lower in the vertical direction than the position where battery 150 is provided, and capacitor 220 and electrical apparatus 115 are located at respective positions so that the entire projection image formed by projecting capacitor 220 and electrical apparatus 115 in the vertical direction to battery 115 overlaps with battery 150. By disposing capacitor 220 and electrical apparatus 115 in this manner, even in the case where the user opens the floor board of the luggage compartment, capacitor 220 and electrical apparatus 115 are hiding behind battery 150. Even though the user inserts his/her hand into the luggage compartment, it can be suppressed that the user touches capacitor 220 and/or electrical apparatus 115.

As described above, since L1, L2 and L3 in vehicle body 110 satisfy the relationship of L2>L3>L1 (see FIG. 6), capacitor 220 is disposed anterior to electrical apparatus 115 in the longitudinal direction of vehicle body 110. The voltage applied to capacitor 220 is higher than the voltage applied to electrical apparatus 115. According to this configuration, in the case where electrically powered vehicle 100 is subjected to an impact from the rear side, the impact is less likely to reach capacitor 220 having a high voltage, and thereby, the damage on capacitor 220 can be suppressed. In particular, since electrical apparatus 115 are disposed posterior to capacitor 220, in the case where the driver or the like opens the hatchback and even winds up the rear end of the floor board, only electrical apparatus 115 is visible below the battery while capacitor 220 is hidden by electrical apparatus 115. In other words, since capacitor 220 is hidden by electrical apparatus 115, it can be suppressed that the user or the like touches capacitor 220 having a high voltage.

First Modification

Figure 7:
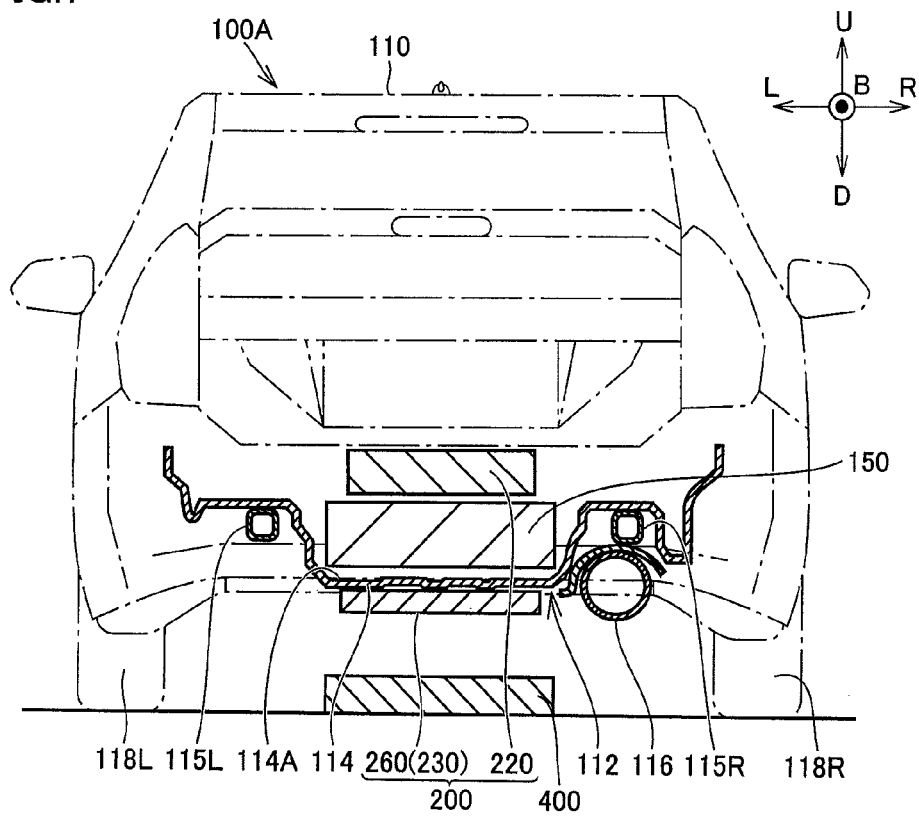
FIG. 7 is a rear view schematically illustrating a cross-sectional configuration of an electrically powered vehicle according to a first modification of the embodiment.

FIG. 7 is a rear view schematically illustrating a cross-sectional configuration of an electrically powered vehicle 100A according to a first modification. Similarly, in the electrically powered vehicle 100A, capacitor 220 is disposed inside vehicle body 110. Electrical apparatus 115 and capacitor 220 are located at respective positions higher in vertically upward direction U (upper side in the vertical direction) than the position where battery 150 is provided. Even with this configuration, the thermal effect on capacitor 220 disposed in power receiving device 200 can be suppressed.

Second Modification

Figure 8:
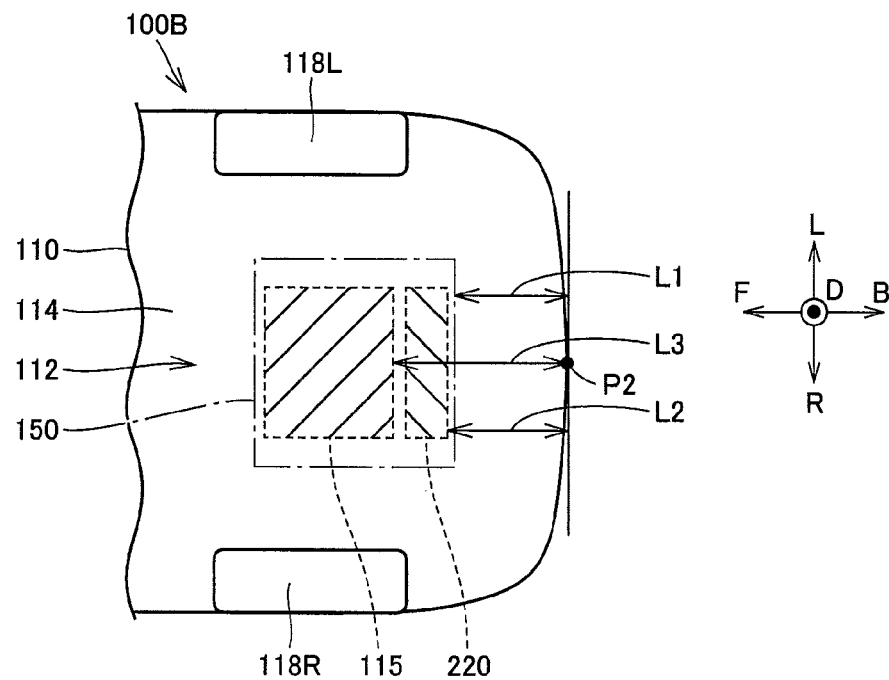
FIG. 8 is a bottom view schematically illustrating an electrically powered vehicle according to a second modification of the embodiment.

FIG. 8 is a bottom view schematically illustrating an electrically powered vehicle 100B according to a second modification of the present invention. Similarly, in electrically powered vehicle 100B, capacitor 220 is disposed inside vehicle body 110. According to the configuration, the thermal effect on capacitor 220 disposed in power receiving device 200 can be suppressed. Similarly, in electrically powered vehicle 100B, capacitor 220 and electrical apparatus 115 are located at respective positions so that the entire projection image formed by projecting capacitor 220 and electrical apparatus 115 in the vertical direction to battery 115 overlaps with battery 150. L1, L2 and L3 in vehicle body 110 satisfy the relationship of L3>L2>L1 in the longitudinal direction of vehicle body 110, and thereby, capacitor 220 is disposed posterior to electrical apparatus 115. According to this configuration, the damage on capacitor 220 and/or electrical apparatus 115 in a tail collision can be suppressed.

In the present modification, capacitor 220 includes a plurality of substrates, and a plurality of capacitor elements such as ceramic capacitors which are provided on the upper surface of each substrate. As the capacitor element, for example, a multilayer ceramic capacitor is often adopted. When operating at a high-temperature, the multilayer ceramic capacitor has a short lifetime, and moreover, since capacitor 220 is applied with a voltage higher than the matching circuit and/or the rectifier, the lifetime thereof is usually shorter than that of the other devices. When it is necessary to replace capacitor 220, by winding up the floor board, it is possible to have access to the housing where capacitor 220 is accommodated so as to remove capacitor 220 for replacement.

Capacitor 220 and electrical apparatus 115 may be disposed at respective positions so that a part of the projection image overlaps with battery 150 instead that the entire projection image has no overlap with battery 150.

Capacitor 220 and electrical apparatus 115 may be aligned in the width direction of vehicle body 110. In this case, L1, L2 and L3 in vehicle body 110 may satisfy the relationship of L3=L2>L1, or may satisfy the relationship of L3>L2>L1, or may satisfy the relationship of L2>L3>L1, or may satisfy any other relationship different from the above relationships.

Third Modification

Although the electrical apparatus and the capacitor have been exemplified as being disposed below or above the battery according to the above embodiment, the first modification and the second modification thereof, the mounting position of the electrical apparatus and the capacitor is not limited to these configurations described above.

Figure 9:
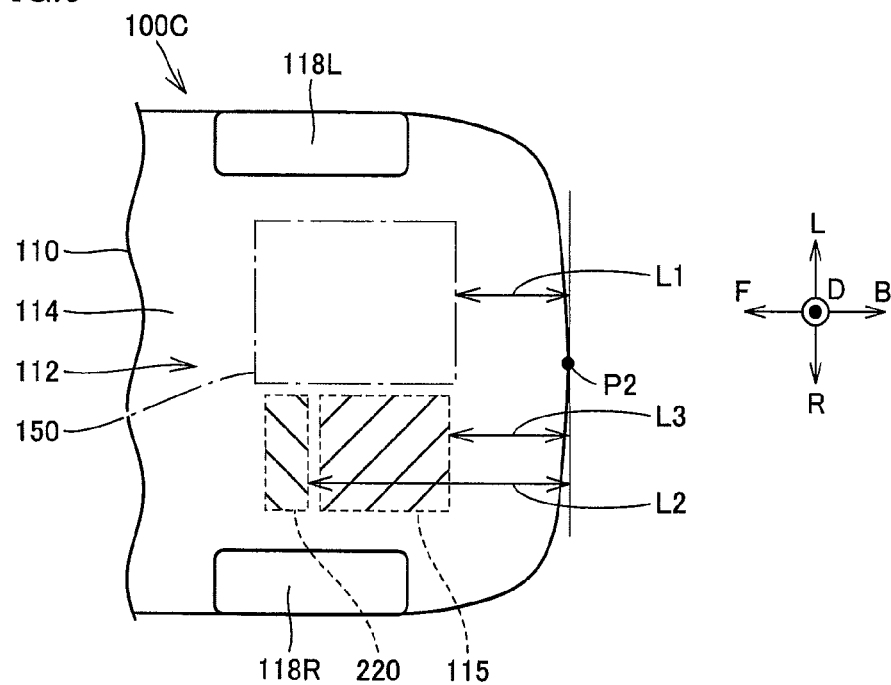
FIG. 9 is a bottom view schematically illustrating an electrically powered vehicle according to a third modification of the embodiment.

FIG. 9 is a bottom view schematically illustrating an electrically powered vehicle 100C in a third modification. As is illustrated in FIG. 9, in electrically powered vehicle 100C, capacitor 220 is also disposed inside vehicle body 110. L1, L2 and L3 in vehicle body 110 satisfy the relationship of L2>L3>L1, and thereby capacitor 220 is disposed anterior to electrical apparatus 115 in the longitudinal direction of vehicle body 110. Capacitor 220 and electrical apparatus 115 are disposed at respective positions so that the entire projection image thereof has no overlap with battery 150. According to this configuration, it is also possible to suppress heat from affecting capacitor 220 disposed in power receiving device 200.

In the present modification, capacitor 220 and electrical apparatus 115 may be aligned in the width direction of vehicle body 110. In this case, L1, L2 and L3 in vehicle body 110 may satisfy the relationship of L3=L2>L1, or may satisfy the relationship of L3>L2>L1, or may satisfy the relationship of L2>L3>L1, or may satisfy any other relationship different from the above relationships.

Fourth Modification

Figure 10:
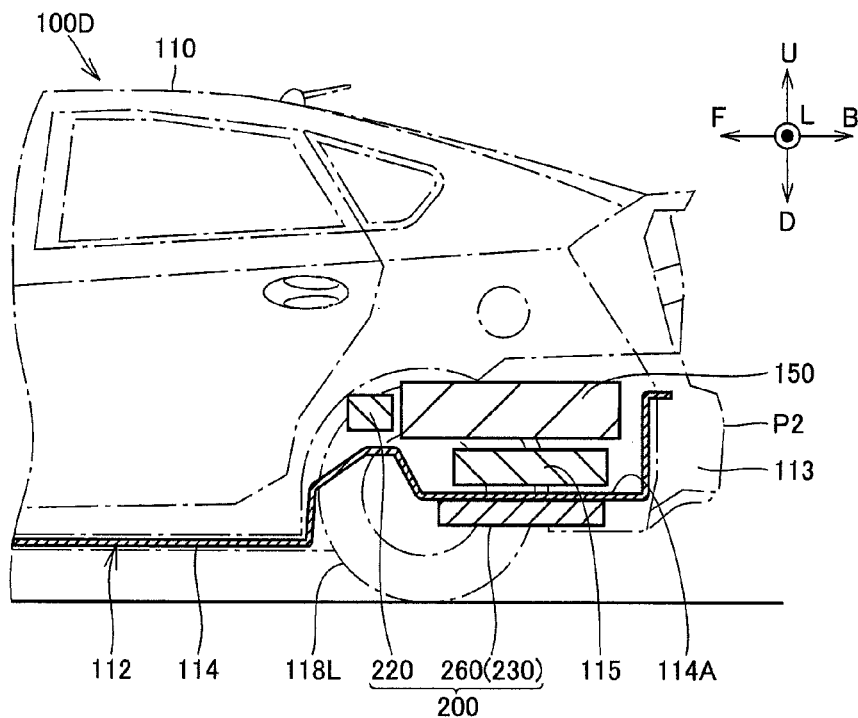
FIG. 10 is a lateral view schematically illustrating a cross-sectional configuration of an electrically powered vehicle according to a fourth modification of the embodiment.

FIG. 10 is a lateral view schematically illustrating a cross-sectional configuration of an electrically powered vehicle 100D according to a fourth modification. Similarly, in electrically powered vehicle 100D, capacitor 220 is disposed inside vehicle body 110. In the present modification, electrical apparatus 115 is located at a position so that the entire projection image formed by projecting electrical apparatus 115 in the vertical direction to battery 150 overlaps with battery 150. On the other hand, capacitor 220 is located at a position anterior to battery 150 so that the entire projection image formed by projecting capacitor 220 in the vertical direction to battery 150 has no overlap with battery 150. According to this configuration, the thermal effect on capacitor 220 disposed in power receiving device 200 can be suppressed. The vertical relationship between battery 150 and electrical apparatus 115 may be opposite to the configuration depicted in FIG. 10. The lateral relationship between battery 150 and capacitor 220 may be opposite to the configuration depicted in FIG. 10.

Fifth Modification

Figure 11:
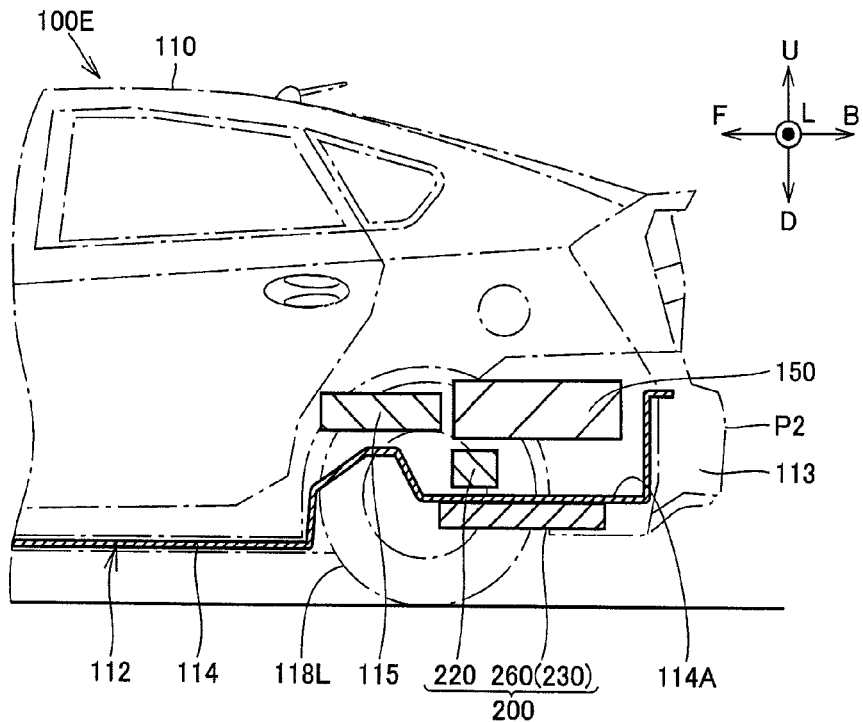
FIG. 11 is a lateral view schematically illustrating a cross-sectional configuration of an electrically powered vehicle according to a fifth modification of the embodiment.

FIG. 11 is a lateral view schematically illustrating a cross-sectional configuration of an electrically powered vehicle 100E according to a fifth modification. Similarly, in electrically powered vehicle 100E, capacitor 220 is disposed inside vehicle body 110. In the present modification, capacitor 220 is located at a position so that the entire projection image formed by projecting capacitor 220 in the vertical direction to battery 150 overlaps with battery 150. On the other hand, electrical apparatus 115 is disposed at a position anterior to battery 150 so that the entire projection image formed by projecting electrical apparatus 115 in the vertical direction to battery 150 has no overlap with battery 150. According to this configuration, the thermal effect on capacitor 220 disposed in power receiving device 200 can be suppressed. The vertical relationship between battery 150 and capacitor 220 may be opposite to the configuration depicted in FIG. 11. The lateral relationship between battery 150 and electrical apparatus 115 may be opposite to the configuration depicted in FIG. 11.

Sixth Modification

Figure 12:
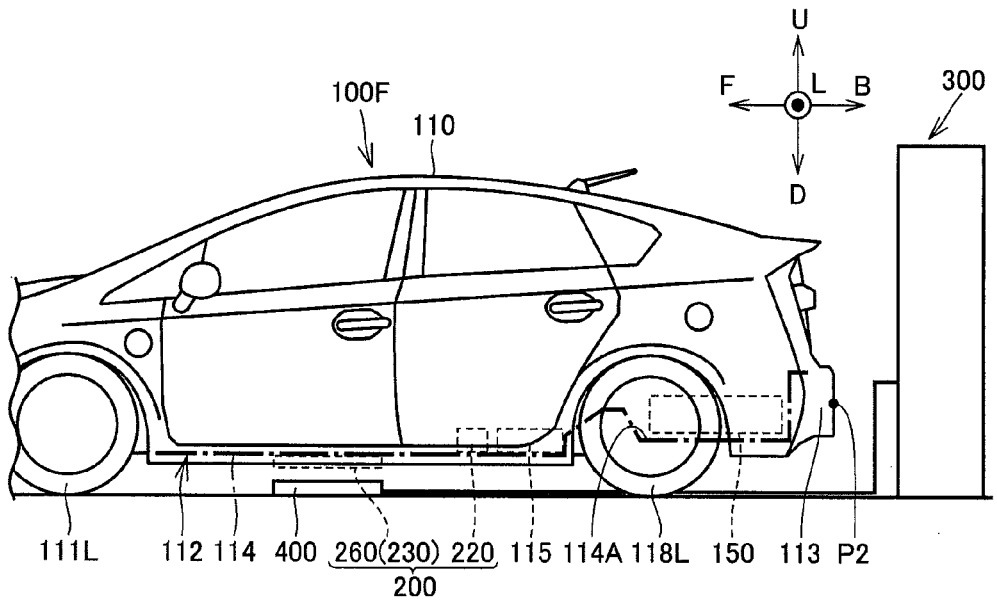
FIG. 12 is a lateral view schematically illustrating an electrically powered vehicle according to a sixth modification of the embodiment.

FIG. 12 is a lateral view schematically illustrating an electrically powered vehicle 100F according to a sixth modification. Similarly, in electrically powered vehicle 100F, capacitor 220 is disposed inside vehicle body 110. In the present modification, a housing 260 that accommodates coil unit 230 is disposed near the center of vehicle body 110 in the longitudinal direction. Capacitor 220 and electrical apparatus 115 are disposed in another single housing which is not shown, and are located between housing 260 and battery 150 in the longitudinal direction of vehicle body 110. According to this configuration, the thermal effect on capacitor 220 disposed in power receiving device 200 can be suppressed.

Seventh Modification

Figure 13:
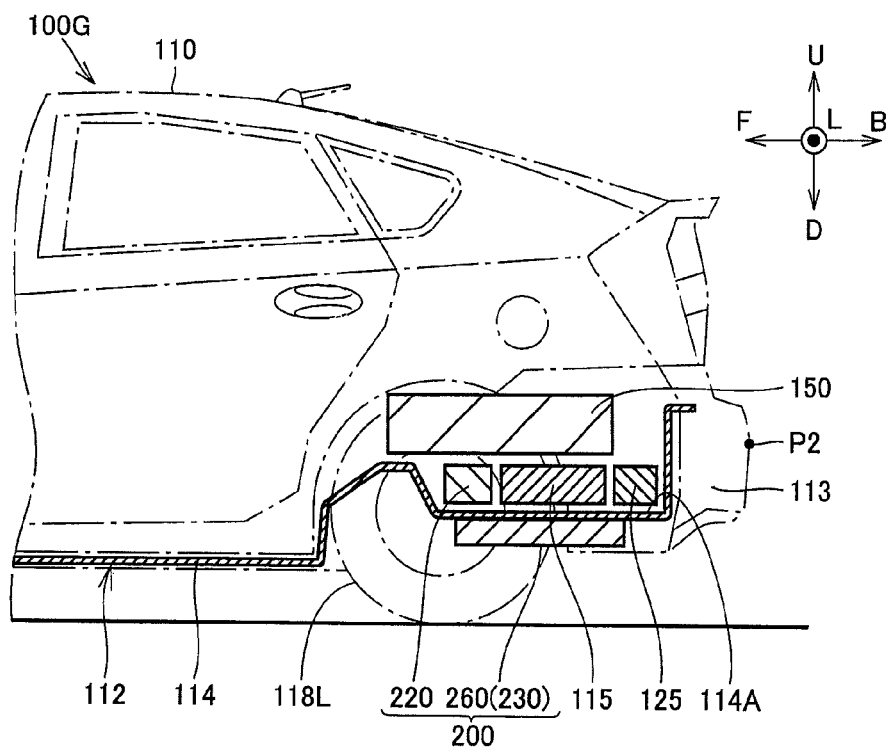
FIG. 13 is a lateral view schematically illustrating a cross-sectional configuration of an electrically powered vehicle according to a seventh modification of the embodiment.

FIG. 13 is a lateral view schematically illustrating a cross-sectional configuration of an electrically powered vehicle 100G according to a seventh modification. Similarly, in electrically powered vehicle 100G, capacitor 220 is disposed inside vehicle body 110. In the present modification, control device 125 is disposed inside vehicle body 110, and is disposed posterior to electrical apparatus 115 in the longitudinal direction of vehicle body 110. Capacitor 220 is positioned anterior to electrical apparatus 115 in the longitudinal direction of vehicle body 110.

As described above with reference to FIG. 2, control device 125 includes MG-ECU 121 (MG: Motor-Generator), vehicle ECU 122, charge ECU 123 and the like. Control device 125 is a device applied with a lower voltage than electrical apparatus 115. When saying that control device 125 is disposed inside vehicle body 110, it means that those ECUs are located at least at respective positions higher in vertically upward direction U than floor panel 114 and located inner to any member constituting vehicle body 110.

According to this configuration, the thermal effect on capacitor 220 disposed in power receiving device 200 can be suppressed. Any one or all of the vertical relationship between battery 150 and capacitor 220, the vertical relationship between battery 150 and electrical apparatus 115, and the vertical relationship between battery 150 and control device 125 may be opposite to the configuration depicted in FIG. 13.

Supposing that when electrically powered vehicle 100G is subjected to an impact from the rear side, control device 125 is susceptible to the impact earlier than electrical apparatus 115 and capacitor 220. Since the impact will be prevented from reaching electrical apparatus 115 and capacitor 220 by control device 125, the damage on electrical apparatus 115 and capacitor 220 is suppressed. Control device 125 may be located at a position so that a part of or the entire part of the projection image formed by projecting control device 125 in the vertical direction to battery 150 overlaps with battery 150.

Eighth Modification

Figure 14:
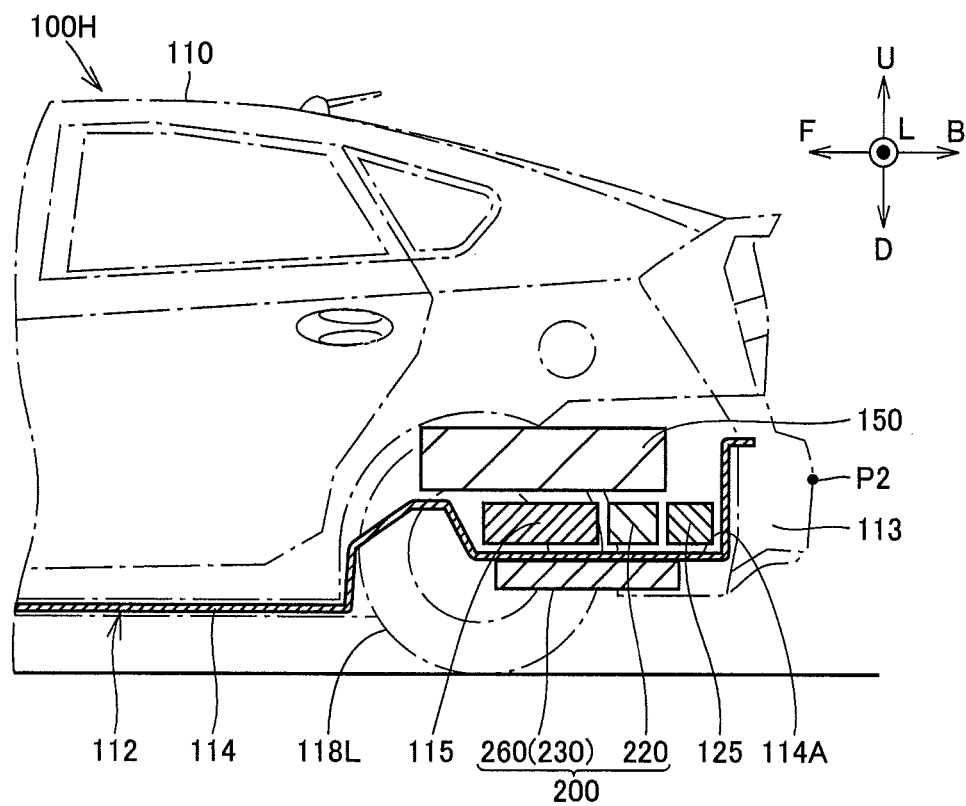
FIG. 14 is a lateral view schematically illustrating a cross-sectional configuration of an electrically powered vehicle according to an eighth modification of the embodiment.

FIG. 14 is a lateral view schematically illustrating a cross-sectional configuration of an electrically powered vehicle 100H according to an eighth modification. Similarly, in electrically powered vehicle 100H, capacitor 220 is disposed inside vehicle body 110. In the present modification, control device 125 is disposed inside vehicle body 110, and is located posterior to electrical apparatus 115 in the longitudinal direction of vehicle body 110. Capacitor 220 is located behind electrical apparatus 115 in the longitudinal direction of vehicle body 110.

According to this configuration, the thermal effect on capacitor 220 disposed in power receiving device 200 can be suppressed. Any one or all of the vertical relationship between battery 150 and capacitor 220, the vertical relationship between battery 150 and electrical apparatus 115, and the vertical relationship between battery 150 and control device 125 may be opposite to the configuration depicted in FIG. 14.

Supposing that when electrically powered vehicle 100G is subjected to an impact from the rear side, control device 125 is susceptible to the impact earlier than electrical apparatus 115 and capacitor 220. Since the impact will be prevented from reaching electrical apparatus 115 and capacitor 220 by control device 125, the damage on electrical apparatus 115 and capacitor 220 is suppressed. Control device 125 may be located at a position so that a part of or the entire part of the projection image formed by projecting control device 125 in the vertical direction to battery 150 overlaps with battery 150.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A vehicle comprising:
a vehicle body having a bottom surface;
a battery disposed inside the vehicle body;
a power receiving device configured to receive electrical power in a non-contact manner from a power transmission coil of a power transmission device disposed outside the vehicle body when facing the power transmission coil; and
an electrical apparatus electrically connected to the power receiving device and the battery for supplying power received from the power receiving device to the battery, wherein the power receiving device includes a power receiving coil disposed on the bottom surface of the vehicle body, and a capacitor disposed inside the vehicle body and electrically connected to the power receiving coil and the electrical apparatus, the battery is located posterior to a central position in a longitudinal direction of the vehicle body, the electrical apparatus is disposed inside the vehicle body, and the electrical apparatus and the capacitor are located at a position either higher or lower in a vertical direction than the position where said battery is disposed.

2. The vehicle according to claim 1, wherein
if in the longitudinal direction of the vehicle body, a distance between a rear end position of the vehicle body and a rear end position of the battery is denoted by L1 and a distance between the rear end position of the vehicle body and a rear end position of the capacitor is denoted by L2, then L2>L1.

3. The vehicle according to claim 1, wherein
the electrical apparatus includes an insulation transformer connected to the capacitor, and
if in the longitudinal direction of the vehicle body, a distance between a rear end position of the vehicle body and a rear end position of the battery is denoted by L1 and a distance between the rear end position of the vehicle body and a rear end position of the electrical apparatus is denoted by L3, then L3>L1.

4. The vehicle according to claim 1, wherein
the capacitor and the electrical apparatus are located below the battery, and
the capacitor and the electrical apparatus are located at respective positions so that an entire projection image formed by projecting the capacitor and the electrical apparatus in the vertical direction to the battery overlaps with the battery.

5. The vehicle according to claim 1, wherein
the capacitor and the electrical apparatus are located at a position lower in the vertical direction than the position where the battery is disposed,
the vehicle further includes a control device disposed inside the vehicle body and configured to be applied with a voltage lower than that applied the electrical apparatus, and
the control device is located posterior to the electrical apparatus in the longitudinal direction of the vehicle body.

6. The vehicle according to claim 1, wherein
the capacitor and the electrical apparatus are located at a position lower in the
vertical direction than the position where the battery is disposed, and
the capacitor is located posterior to the electrical apparatus in the longitudinal direction of the vehicle body.

* * * * *